(Model.)
N. D. STANLEY.
PRUNING IMPLEMENT.
No. 248,522. Patented Oct. 18, 1881.
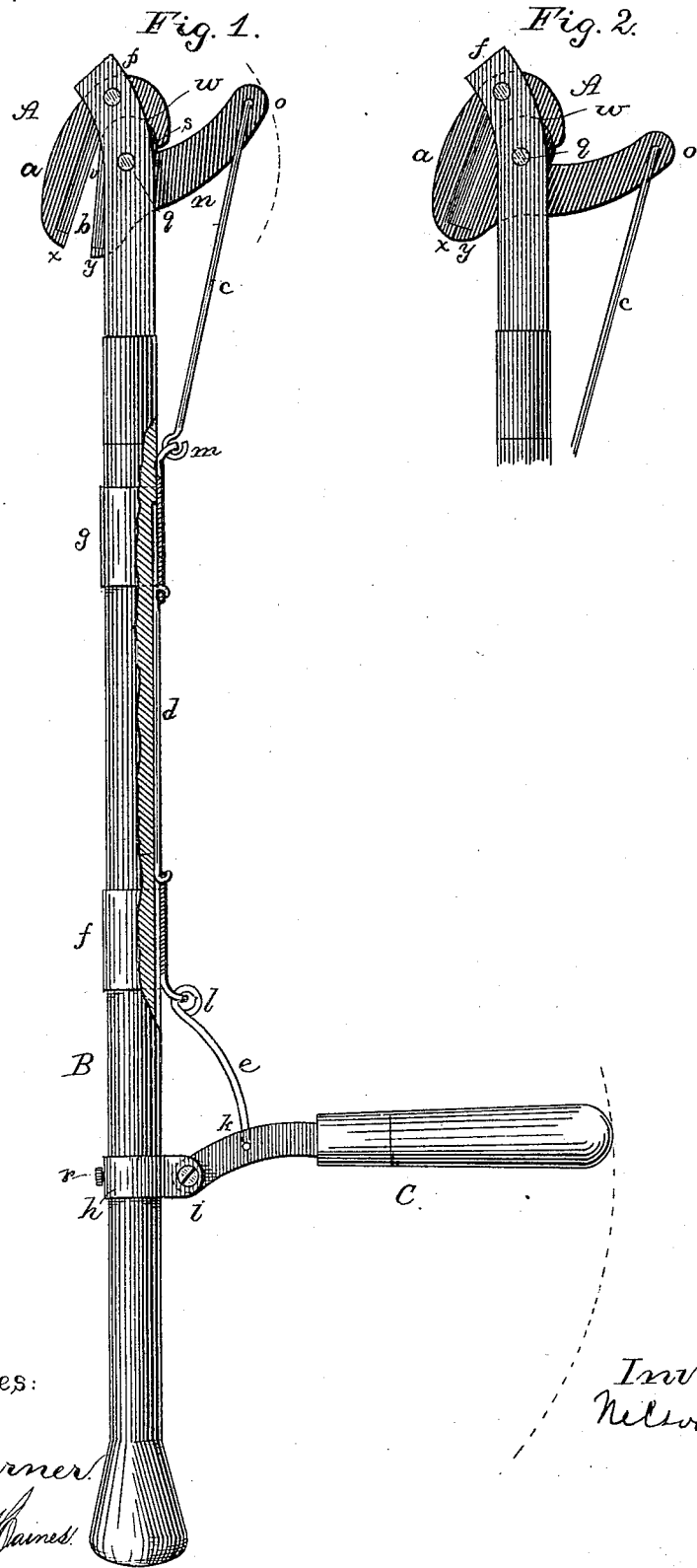
Witnesses:
J. W. Garner
H. S. D. Haines
Inventor:
Nelson D. Stanley

UNITED STATES PATENT OFFICE.

NELSON D. STANLEY, OF ESSEX, ASSIGNOR OF ONE-HALF TO CHARLES R. ELY, OF NORTHFIELD, VERMONT.

PRUNING IMPLEMENT.

SPECIFICATION forming part of Letters Patent No. 248,522, dated October 18, 1881.

Application filed June 1, 1881. (Model.)

*To all whom it may concern:*

Be it known that I, NELSON D. STANLEY, a citizen of the United States, residing at Essex, in the county of Chittenden and State of Vermont, have invented certain new and useful Improvements in Pruning-Hooks; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention is an improvement in a class of tools used for trimming fruit-trees known as "pruning-hooks," the especial feature of which is a device for causing the edges of the knife-blades in cutting to move toward each other and to intersect in the same plane of motion, thereby avoiding the sidewise wrenching that would occur if the knives moved in different planes, as is usually the case with shears or common pruning-hooks.

In the accompanying drawings, Figure 1 represents a side view of the improved pruning-hook, and Fig. 2 shows the same side with the knives shut together.

In Fig. 1, A represents the head or top part of the tool, composed of the knives $a$ and $b$, which are pivoted on the top of the handle B at $f$ and $g$. The manner of working the knives is by moving the lever C, which is connected with the shank of the knife $b$ by the rods $c$, $d$, and $e$ at the joints $o$, $l$, $m$, and $k$. These rods are kept in place and guided by a spring fastened to the ferrules $g$ and $f$, which slide upon the handle B. The rod $d$ works in a groove in the handle, the manner of which is shown in the drawings by one side being cut away and represented in section. The lever C works up and down by the pivot $i$, and is fastened to the handle B by the band $h$, bent around B, and fastened to it by the set-screw $r$. The curve $v\ w\ s$ shows a cam motion between the knives, its purpose being to assist in opening the edges to a greater distance by pushing up the blade $a$. The way in which this works is as follows: The radius $q\ w$ is greater than the distance $q\ v$, so that when the shank $n$ rises the point $w$ moves over toward or follows the joint $v$, and hence the upper knife is pushed outward and upward, and thus the knives open wider than they would were it not for this motion. In the reverse motion the knives shut together when the edges are nearly closed, the parts of the cam $w\ s$ begin to crowd, and tend to move a point at $s$ upward and outward, the power of the approaching blades being increased by the force applied at $s$. The stops $x$ and $y$ are formed upon the outer edges of the knife-blades $a$ and $b$, as shown, and prevent them from coming in contact when brought together.

The operation of the hook is as follows: The handle or lever C is raised, pushing up the shank $o$, connecting-rods, and the blade $b$. When the knives are a little way open, by the operation of the cam-surface $v\ w\ s$ the blade $a$ is forced upward, the upper knife is hooked over a vine to be cut, and the handle C is pulled down, which forces the edges together.

What I claim, and desire to secure by Letters Patent, is—

1. The stops $x$ and $y$, in combination with the knife-blades $a$ and $b$, with their edges working in the same plane of motion, substantially as above shown and described.

2. In pruning implements, the blades or knives $a$ and $b$, pivoted at the points $p$ and $q$, and provided with cam-surfaces $v\ w\ s$, substantially as described.

In testimony whereof I affix my signature in presence of two witnesses.

NELSON D. STANLEY.

Witnesses:
CHAS. H. SCRIBNER,
E. A. BEACH.